United States Patent [19]
Austin et al.

[11] Patent Number: 5,860,151
[45] Date of Patent: Jan. 12, 1999

[54] DATA CACHE FAST ADDRESS CALCULATION SYSTEM AND METHOD

[75] Inventors: Todd M. Austin, Madison, Wis.; Dionisios N. Pnevmatikatos, Athens, Greece; Gurindar S. Sohi, Madison, Wis.

[73] Assignee: Wisconsin Alumni REsearch Foundation, Madison, Wis.

[21] Appl. No.: 568,609

[22] Filed: Dec. 7, 1995

[51] Int. Cl.⁶ .................................................. G06F 12/00
[52] U.S. Cl. ........................................ 711/213; 711/220
[58] Field of Search ........................ 395/403, 421.03, 395/421.04, 421.09, 421.1; 711/3, 213, 214, 219, 220

[56] References Cited

U.S. PATENT DOCUMENTS 5,335,333  8/1994  Hinton et al. ................... 395/421.1 X
5,386,523  1/1995  Crook et al. ...................... 395/421.1
5,584,000  12/1996  Benschop et al. ................. 395/387
5,649,143  7/1997  Parady .............................. 395/421.1

*Primary Examiner*—David L. Robertson
*Attorney, Agent, or Firm*—Quarles & Brady

[57] ABSTRACT

The data cache features an improved mechanism for accessing data from the data memory array of a data cache, by generating a predicted address and using it to access the data cache array in parallel with the effective address computation. The logic circuitry consists of elements which are capable of performing a carry-free addition (logical or arithmetic) of a predetermined number of base register address bits with the same number of offset register address bits. Methods to generate and verify the predicted index are also provided.

4 Claims, 3 Drawing Sheets

ABSTRACT

DATA CACHE FAST ADDRESS CALCULATION SYSTEM AND METHOD

FIELD OF THE INVENTION

The present invention relates generally to data cache access and more particularly to a method and apparatus for streamlining data cache access with fast address calculation.

BACKGROUND OF THE INVENTION

Successful high-performance processor implementations require a high instruction completion rate. To achieve this goal, pipeline hazards must be minimized, allowing instructions to flow uninterrupted in the pipeline. Data hazards, an impediment to performance caused by instructions stalling for results from executing instructions, can be minimized by reducing or tolerating functional unit latencies. A need exists for a pipeline optimization scheme that reduces the latency of load instructions, resulting in fewer data hazards and better program performance.

There are many contributing factors to the latency of a load instruction. If a load hits in the data cache, the latency of the operation on many modern microprocessor architectures is 2 cycles: one cycle to compute the effective address of the load, and one cycle to access the data cache. If the load does not hit in the data cache, the latency is further increased by delays incurred with accessing lower levels of the data memory hierarchy, e.g., cache misses or page faults.

Much has been done to reduce the performance impact of load latencies. The approaches can be broadly classified into two areas: techniques which assist programs in tolerating load latencies, and techniques which reduce load latencies. Tolerating load latencies involves moving independent instructions into unused pipeline delay slots. This reallocation of processor resources can be done either at compile-time, via instruction scheduling, or at run-time with some form of dynamic processor scheduling, such as decoupled, dataflow or multi-threaded. For a given data memory hierarchy, a good approach to reducing load latencies is through better register allocation. Once placed into a register, load instructions are no longer required to access data.

There are, however, limits to the extent to which existing approaches can reduce the impact of load latencies. Tolerating techniques require independent work, which is finite and usually quite small in the basic blocks of control intensive codes, e.g., many integer codes. The current trend to increase processor issue widths further amplifies load latencies because exploitation of instruction level parallelism decreases the amount of work between load instructions. In addition, tolerating these latencies becomes more difficult since more independent instructions are required to fill pipeline delay slots. Global scheduling techniques have been developed as a way to mitigate this effect. Latency reduction techniques are also limited in their potential use. Latency reduction in the form of register allocation is limited by the size and addressability of register files, forcing many program variables into memory.

A solution to the problem of load latencies on performance impact is needed which additionally avoids the problems occurring in the prior art approaches. The present invention provides a solution to these and other problems, offering advantages over the prior art.

SUMMARY OF THE INVENTION

The present invention is directed to a data cache capable of streamlining data cache access with fast address calculation. The data cache features an improved mechanism for accessing data from the data memory array of a data cache, by generating a predicted address and using it to access the data cache array in parallel with the effective address computation. The logic circuitry consists of elements which are capable of performing a carry-free addition (logical or arithmetic) of a predetermined number of base register address bits with the same number of offset register address bits.

The present invention also includes a method for predicting an effective address in a data memory array. This method includes deriving a predicted index as a carry-free addition of a predetermined number of base register address bits with the same predetermined number of offset register address bits which uniquely address a particular portion of the data memory array. Subsequently, the particular portion of the data memory array is selected through the use of the predicted index. The content of at least one memory cell in the selected particular portion of the data memory array is provided to an output port operatively coupled to the data memory array.

These and various other features, as well as advantages which characterize the present invention, will be apparent upon reading of the following detailed description and review of the associated drawings.

DETAILED DESCRIPTION

The present invention works to reduce load instruction latency by allowing effective address calculation to proceed in parallel with cache access, thereby eliminating the extra cycle required for address generation. The technique uses a simple circuit to quickly predict the portion of the effective address needed to speculatively access the data cache. If the address is predicted correctly, the cache completes without an extra cycle for address calculation. If the address is mispredicted, the cache is accessed again in the next cycle using the correct (non-predicted) effective address. The prediction circuit is designed to minimize its impact on cache access time, adding only a single OR operation before cache access can commence. Verification of the predicted effective address is completely decoupled from the cache access critical path. The use of fast address calculation benefits from software support: a compiler and linker conscious of the fast address calculation mechanism significantly reduce the number of mispredicted addresses.

Figure 1:
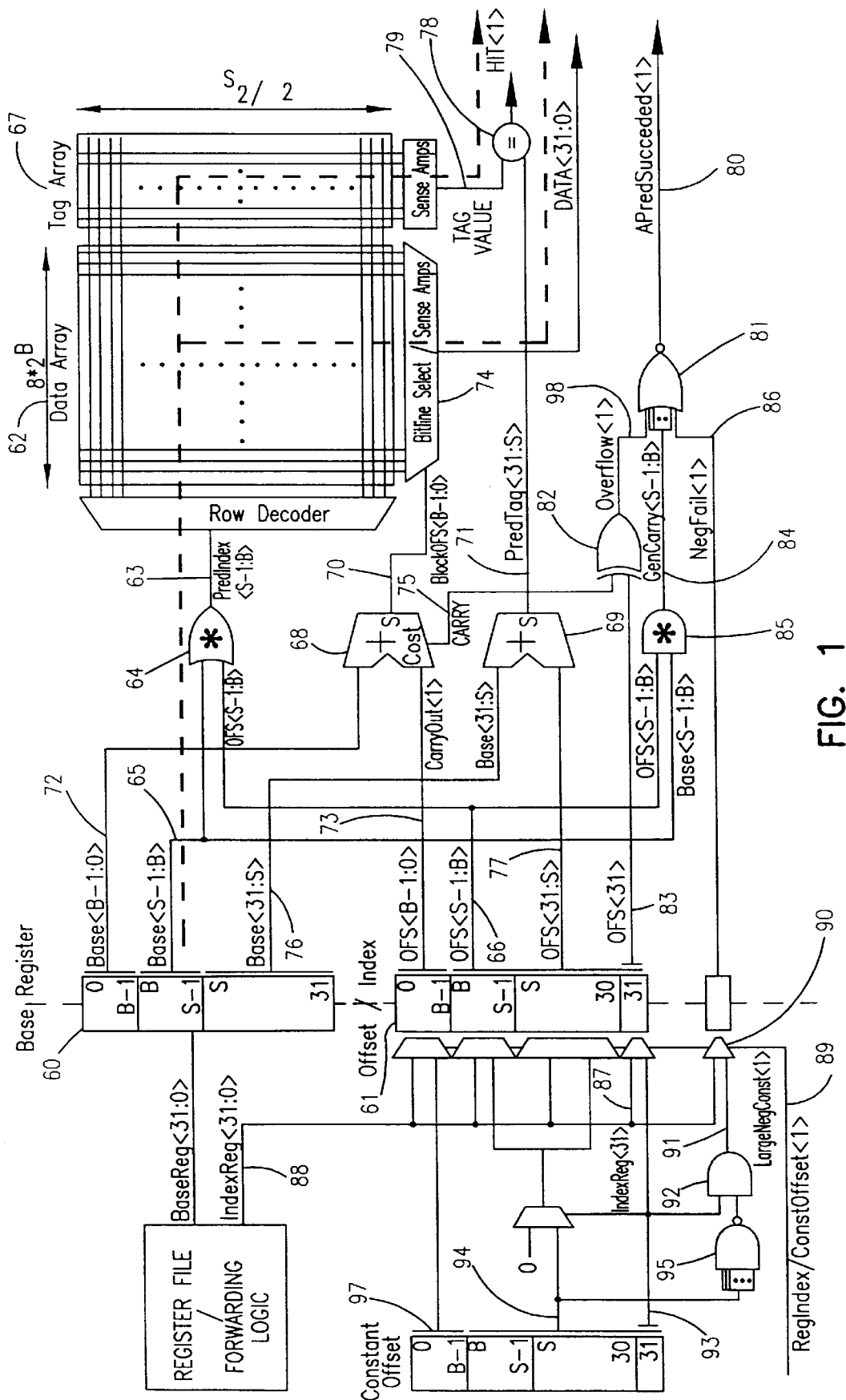
FIG. 1 is a block diagram showing a fast address calculation system.

Referring now to FIG. 1, the present invention contains two primary logic circuits that receive input bits from a base register 60 and an offset register 61. The first logic circuit is an effective address prediction mechanism which generates a predicted (speculative) address and locates the corresponding data at that predicted address in the data memory array 62. The second logic circuit is a verification circuit which determines whether the predicted address generated by the first logic circuit is the correct address.

Turning first to the effective address prediction mechanism, FIG. 1 shows the straightforward implementation of this circuit for an on-chip direct-mapped cache. The predicted index 63, the set index portion of the predicted effective address, is supplied very early in the cache access cycle from a logical OR 64 of the set index portion 65 of the base register address and the set index portion 66 of the offset register address. The "*" in the logical OR 64 signifies a replicated gate for every line of the connected bus and thus each predicted row index bit is the result of a logical OR of a base register address bit from the predetermined number of base register address bits 65 and one corresponding offset register address bit from the predetermined number of offset register address bits 66. This operation is a limited form of addition called carry-free addition which ignores any carries that may have been generated in, or propagated into, the predicted index 63 calculation. Many offsets are small and therefore the set index portion 66 of the offset will often be zero, allowing this fast computation to succeed. For larger offsets, like those applied to the global or stack pointer, software support can be utilized to align pointer values, thereby increasing the likelihood that the set index portion 65 of the base register value is zero. The predicted index 63 is used to read an entire cache row of memory cells from the data memory array 62 and a tag value from the tag array 67.

In parallel with access of the cache data memory array 62 and tag array 67, full adders 68 and 69 are used to compute the block offset portion 70 and the tag portion 71 of the predicted effective address. The block offset adder 68 adds a particular number of base register address bits 72 with the same particular number of offset register address bits 73, producing the block offset portion 70 of the predicted effective address. The particular number of offset register address bits 73 and base register bits 72 added in the block offset adder 68 is at least equal to $\log_2$ of the memory cell width of the plurality of rows in the data memory array 62. Late in the cache cycle, a bit line select circuit, consisting of a multiplexor 74, uses the block offset portion 70 of the predicted effective address to select the referenced word from the cache row that was previously located by the predicted set index 63 of the predicted effective address. The carry-out 75 from the block offset adder 68 is operatively connected to the verification circuit, which is described later. The tag adder 69 adds a particular number of base register address bits 76 with the same particular number of offset register address bits 77, producing the predicted tag 71 of the predicted effective address. The particular number of base register address bits 76 and offset register address bits 77 added in the tag adder 69 is at least equal to the total number of base register address bits minus $\log_2$ of the size of the data memory array. At approximately the same time in the cycle that the data is selected from the referenced row in the data memory array 62, a tag comparator 78 compares the predicted tag 71 of the predicted effective address with the tag value 79 from the tag array 67 to determine if the access hit in the cache (i.e., that the predicted address that was intended to be located in the data memory array 62 was in fact located). This operation is distinct from that performed by the verification circuit, discussed next, which determines whether the predicted effective address was the correct address.

The hardware design of the invention also includes a verification circuit which is completely decoupled from the cache access critical path. Based on the verification circuit's output 80, the cache controller and the instruction dispatch mechanism (not shown) can determine if cache access needs to be reexecuted in the following cycle using the non-speculative (non-predicted) effective address. The verification circuit consists of the logical NOR (not OR) 81 and related circuitry that provides input into the logical NOR 81. Since the verification circuit's output 80 is through a logical NOR 81, any input into this gate can, by itself, cause a misprediction, i.e., a failure to predict the effective address correctly.

Figure 2:
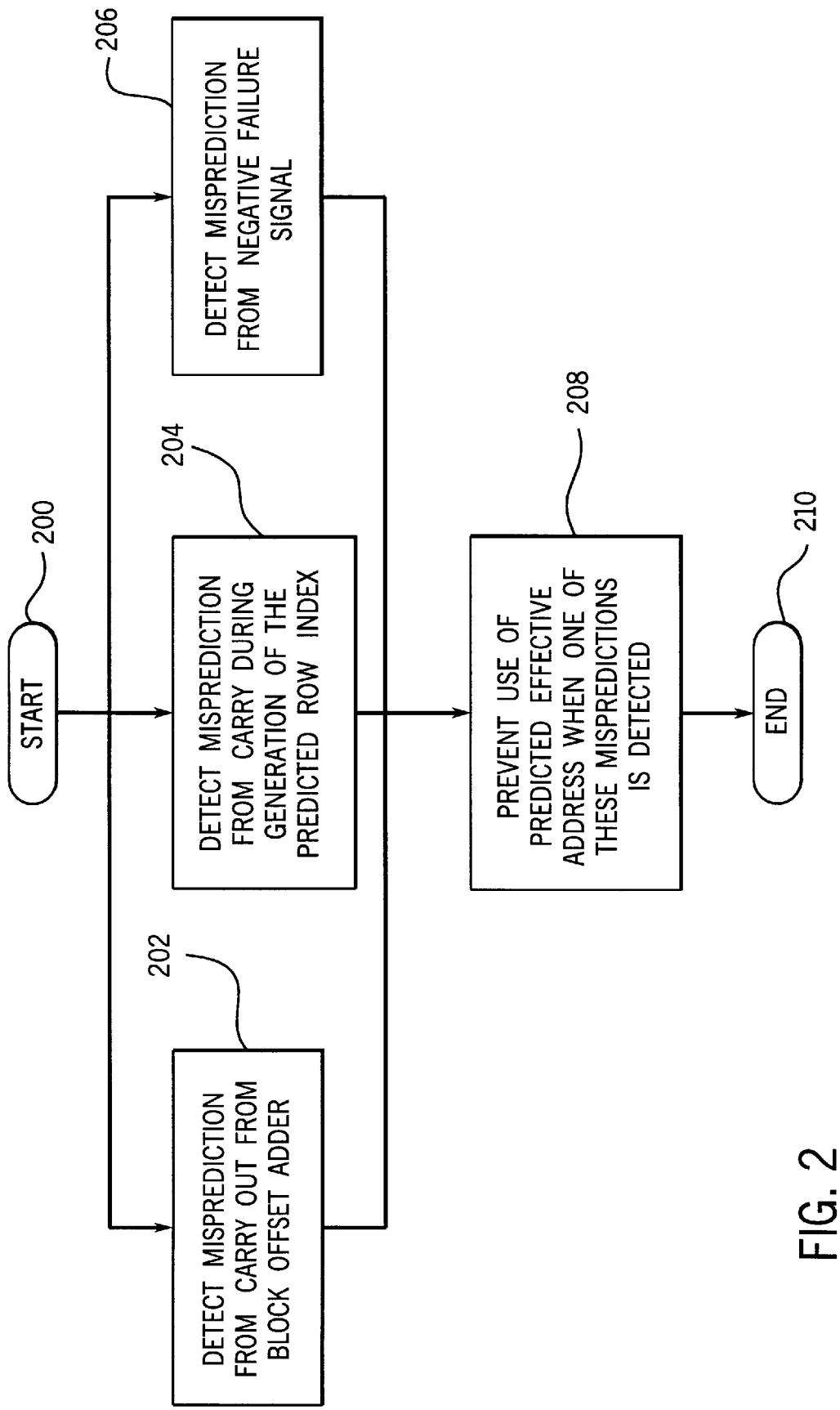
FIG. 2 is a flowchart of the verification algorithm used in the verification circuit portion of the system shown in FIG. 1.

Referring now to FIG. 1 and FIG. 2, the latter depicting a flow-chart of the preferred embodiment operations of the verification circuit for many different failure conditions in flowchart elements 200–210. First, a misprediction is detected (failure exists) 202 when a carry-out 75 is generated from the block offset adder 68 into the logical XOR (exclusive OR) 82. The presence (or absence) of a carry-out 75 from the block offset adder 68 controls the output 98 from the logical XOR 82 (which in turn is the input to the logical NOR 81) because the offset register address bit 83 that inputs into the logical XOR 82 is a constant high.

Second, a misprediction is detected 204 if any carry 84 occurs during the generation of the predicted row index 63. The logical AND 85 with the "*" indicates a replicated gate for every line of the connected bus. Accordingly, each corresponding bit of the set index portion 65 of the base register address and the set index portion 66 of the offset register address (the two inputs that are OR'ed together to produce the predicted index 63) are operatively connected by a logical AND 85 (AND'ed together), and therefore if any operation produces a carry 84, i.e. both bits are 1, the result will carry into the logical NOR 81, resulting in a detected misprediction.

Finally, a misprediction occurs 206 if there is a negative failure signal 86. A negative failure signal 86 is present when one of the following situations occurs: first, when a particular bit 87 from a set of index bits 88 having a negative value is selected by the select offset bit 89 at the multiplexor 90; or, second, when a large negative constant signal 91 is selected by the select offset bit 89 at the multiplexor 90. A large negative constant signal 91 is generated from the logical AND 92 when there is a set of constant offset bits 94 that has a negative value (constant offset register bit 31 93 is high) and which is too large (in absolute value) to result in an effective address within the same cache block as the base register address. The value of the set of constant offset bits 94 is too large when at least one bit in the set 94, all of which are input into the logical NAND (not AND) 95, is high.

If any of these mispredictions occur, then the verification circuit prevents 208 the use of the predicted effective address in accessing the data cache.

The invention has been designed to minimize impact on the cache access critical path. The two typical cache access critical paths are denoted with bold dashed lines in FIG. 1. Three paths through the prediction circuit could affect the cache access cycle time. The first is through the tag adder 69. The predicted tag 71 must arrive at the tag comparator 78 before the tag array output 79 becomes stable. For small addresses and large cache set sizes, this computation will likely complete before tag comparison. For large addresses and small cache set sizes, this computation may not complete in time. For these designs, the logical OR operation used to compute the set index could also be used to compute the tag portion of the address.

The second path that could affect cycle time runs through the block offset adder 68. This result must arrive at the data array multiplexor 74 before the data memory array 62 produces stable output. For most cache designs, a 4- or 5-bit adder should suffice for this computation. The complexity of the block offset adder 68 is small, on the order of the cache row decoders, hence, this part of the design will likely not impact the cache access critical path.

The third path that could affect cache access cycle time is through the prediction verification circuit. Since this circuit is completely decoupled from the normal cache access, it cannot affect the cache access cycle time as long as validation of the predicted effective address completes before the end of the clock cycle. This prediction verification, however, could affect processor cycle time if it is not available early enough to allow the processor control logic (not shown) to schedule operations for the following cycle (a function of the success and failure of memory accesses in the current cycle). Since the verification circuit is very simple, it is not expected to impact the processor cycle time.

The OR operation 64 used to generate the upper portion of the effective address is, however, located directly on the critical paths denoted in FIG. 1. The impact of this operation may or may not impact processor cycle time, depending on the specifics of the pipeline design. In some designs, it may be possible to integrate the OR operation into the address decoder logic or the execute stage input latches, possibly reducing cycle time impact to zero.

The fast address generation mechanism in the present invention assumes that data cache access can start as soon as the predicted index 63 is available. If this is not the case (e.g., the cache is indexed with a translated physical address) the approach of this invention will not work.

Another important consideration is the handling of stores. The question of whether or not to speculate stores really depends on the specifics of the memory system. If stalling a store can cause a load to stall (e.g., the processor executes all memory accesses in order), performance may be improved by speculatively executing stores. For designs that speculatively execute stores, care must be taken to ensure that a mis-speculated store can be undone. For designs employing a store buffer, this may not pose a problem as the approach uses a two-cycle store sequence. In the first cycle the tags are probed to see if the access hits in the cache. In the second (possibly much later) cycle the store is made to the cache. Since the fast address calculation mechanism determines the correctness of the address after one cycle, the store buffer entry can simply be reclaimed or invalidated if the effective address is incorrect. Possibly more important to consider, however, is the effect of increased bandwidth demand due to mis-speculated accesses on store buffer performance. With speculative cache accesses stealing away free cache cycles, the processor may end up stalling more often on the store buffer, possibly resulting in worse overall performance.

The present invention can be summarized in reference to FIG. 1 which depicts the preferred embodiment capable of streamlining data cache access with fast address calculation. The data cache of the present invention includes a data memory array 62 with multiple rows of memory cells and logic circuitry 64 (row address predictor 64) that generates a predicted row index 63 which addresses one of the rows in the data memory array 62. The logic circuitry 64 consists of elements which are capable of performing a carry-free addition of a predetermined number of base register address bits 65 with the same number of offset register address bits 66.

In one preferred embodiment, the logic circuitry 64 generates the predicted row index by using the predetermined number of base register address bits 65 as a set of predicted row index bits when each of the offset register address bits from the predetermined number of offset register address bits 66 equals a null bit (e.g., a logical zero in positive logic circuits).

In another preferred embodiment, the predetermined number of base register address bits 65 and the predetermined number of offset register address bits 66 each comprise low order bits, middle order bits, and high order bits. The low order bits preferably are actual block offset bits for the data cache, but may additionally include other bits. The middle order bits preferably are set bits for the data cache, but may be other bits associated with the data cache. The high order bits preferably are tag bits for the data cache, but may be other bits associated with the data cache.

The logic circuitry 64 generates the set of predicted row index bits as the predicted row index where each predicted row index bit is a function of a base register address bit from the predetermined number of base register address bits 65 and one corresponding offset register address bit from the predetermined number of offset register address bits 66. The function for calculating each predicted row index bit may be one of several different functions. For example, the function may be a logical OR, a logical exclusive-OR, or an arithmetic ADD. The particular function used in calculating each predicted row index bit is dependent upon the order of the bits of the base and offset register address bits being used in the calculation. In other words, each of the three orders of bits (i.e., low, middle, and high) may have a different function applied to the bits of that order.

For example, the predicted row index can be calculated as a logical OR or exclusive-OR (XOR) of some low order bits from both registers in conjunction with logically ADDing, ORing, or XORing some high order bits from both registers or directly using (i.e., without performing one of these functions) some high order base register bits. Similarly, the predicted row index can be calculated as an ADD, OR or XOR of some low order bits from both registers, ORing, XORing, or directly using some middle order bits, and ADDing, ORing, XORing, or directly using some high order bits. It will be appreciated by those skilled in the art that other combinations of the functions applied to the three bit orders may be used to calculate the predicted row index without departing from the scope and spirit of the present invention.

In another preferred embodiment, the logic circuitry 64 generates the predicted row index by generating a set of predicted row index bits with carry-free addition. Each predicted row index bit is the result of a logical OR 64 or logical XOR (not shown) of a base register address bit from the predetermined number of base register address bits 65 and one corresponding offset register address bit from the predetermined number of offset register address bits 66.

In any of these embodiments, the number of base register address bits 65 and offset register address bits 66 that are used to perform the carry-free addition is a function of size of the data memory array and memory cell width of the plurality of rows in the data memory array. For example, in the specific preferred embodiments shown and described in reference to FIG. 1, this number is at least equal to $\log_2$ of the size of the data memory array minus $\log_2$ of the memory cell width of the plurality of rows in the data memory array 62 minus one.

The data memory array 62, the row address predictor 64, and a bit line selector (i.e., multiplexor 74) select a cell from the selected row of memory cells in the data memory array 62. The multiplexor 74 preferably selects a particular memory cell in the selected row based on a block offset signal 70 that is generated by an adder 68. Input to the adder 68 consists of a particular number of base register address bits 72 and offset register address bits 73, the particular number of these bits being at least equal to $\log_2$ of the memory cell width of the plurality of rows in the data memory array 62.

The data memory array 62 preferably includes a tag array 67 with rows corresponding to each row of the memory cells. A comparator 78 is operatively coupled to the tag array 67 which compares the row of the tag array 67 corresponding to the selected row of the data memory array 62 with a predicted tag 71 that is generated by an adder 69. Input to the adder 69 consists of a particular number of offset register address bits 77 and base register address bits 76. In the preferred embodiment, the particular number is at least equal to the total number of base register address bits minus $\log_2$ of the size of the data memory array.

A base register 60 and an offset register 61 is operatively coupled to the row address predictor 64. The base register 60 and offset register 61 store bits for at least one clock cycle and subsequently provide these bits to the row address predictor 64 in another clock cycle. The offset register 61 receives, based on a select bit 89, either a set of index register bits 88 or a set of constant offset bits 93, 94 and 97.

A verification circuit, which is decoupled from the data memory array critical path, determines whether there was a failure in predicting the effective address in the data memory array 62. Supplemental circuitry (not shown) is provided for executing a non-predicted effective address in the event that the verification circuit determines a failure in predicting an effective address in the data memory array 62.

The verification circuit includes a mechanism which controls the use of the row address predictor 64 instead of the supplemental circuitry to access memory cells in the data memory array based upon one or more prediction rules. Some examples of these prediction rules are:

only predicting a row address when the offset register address bits equal null bits, a only predicting a row address when the offset register address bits represent a small value, only predicting a row address for particular classes of microprocessor instructions (e.g., store and load instructions), only predicting a row address for microprocessor instructions marked by a compiler, or always predicting a row address.

The verification circuit may include one or more sub-circuits which determine the occurrence of a failure in predicting an effective address in the data memory array 62 based on different criteria. One such sub-circuit 68 generates a carry out error signal 75 when a carry-out occurs from generation of the block offset signal 70 by an addition of a particular number of base register address bits 65 with the same particular number of offset register address bits 66.

Another sub-circuit 85 generates a predicted row index carry out error signal 84 when a carry occurs from generation of the predicted row index by an addition of a particular number of base register address bits 65 with the same particular number of offset register address bits 66.

Another sub-circuit 92 generates a large negative constant error signal 91 as a function of a set of constant offset bits 93, 94 which have a negative value large enough to result in an effective address being in a block of the data memory array 62 different from a block of the data memory array 62 addressed by the base register address bits. This set of constant offset bits 93, 94 represents an absolute offset used with each access of a block within the data memory array 62.

Another sub-circuit 61 generates an index register signal 83 which is generated by a particular bit from a set of index register bits having a negative value. The particular bit forms part of a predetermined offset used with each access of a block within the data memory array 62 for corresponding base register address bits.

The above-described improved data cache may be utilized in many different types of computing devices. One such computing device comprises a microprocessor which accesses a data storage device to obtain particular information required for processing a machine-executable instruction. The data cache is operatively coupled to the microprocessor such that the microprocessor accesses the data cache to search for the particular information stored in the memory cells of the memory array prior to accessing the data storage device. This type of cache access is typically faster than retrieving information from many slower access data storage devices. This results in the microprocessor not having to wait as long to continue processing pipelined instructions when waiting for information from the data storage device.

One such instance when this may improve overall performance of the computing device is when the microprocessor is processing a load instruction. The load instruction is waiting for information in the data storage device so that it can load it into a register. If such information is accessed through a data cache, then the load instruction can be processed earlier in a pipelined processing stage which reduces average latency (number of wait stages) in executions in the microprocessor. Another benefit is that the microprocessor clock cycle (if address calculation is on the processor cycle time critical path) can be shortened. It will be appreciated by those skilled in the art that the data storage device may be a random access memory (RAM), read only memory (ROM), magnetically encoded medium (e.g., a floppy, hard disk or tape), or any other data storage device without departing from the scope and spirit of the present invention. The key aspect of this data storage device is that accessing and retrieving information from it is typically slower than that which can be achieved by the microprocessor in conjunction with a data cache which caches recently retrieved/stored information from/to the data storage device such that quick access to this information is provided to the microprocessor.

Another computing device which may improve performance by using the above described predicted address calculation scheme is a device having a microprocessor which accesses a page table (another type of data memory array) to translate a virtual address to a physical address in a memory device. The address prediction device is operatively coupled to the microprocessor to provide fast access to a translation look-aside buffer (TLB) such that the microprocessor accesses the TLB to search for a particular entry in the page table which is replicated in the memory cells forming the bufferprior to accessing the page table. Page tables are typically arranged in memory in a tree structure and as such require multiple accesses to obtain a result. In contrast, the TLB can store an entire path in the tree in a single sequence within the buffer so that a result can be obtained in a single access of the buffer. The address predictor can be configured to provide a pointer to the start of such a sequence in the TLB.

Figure 3:
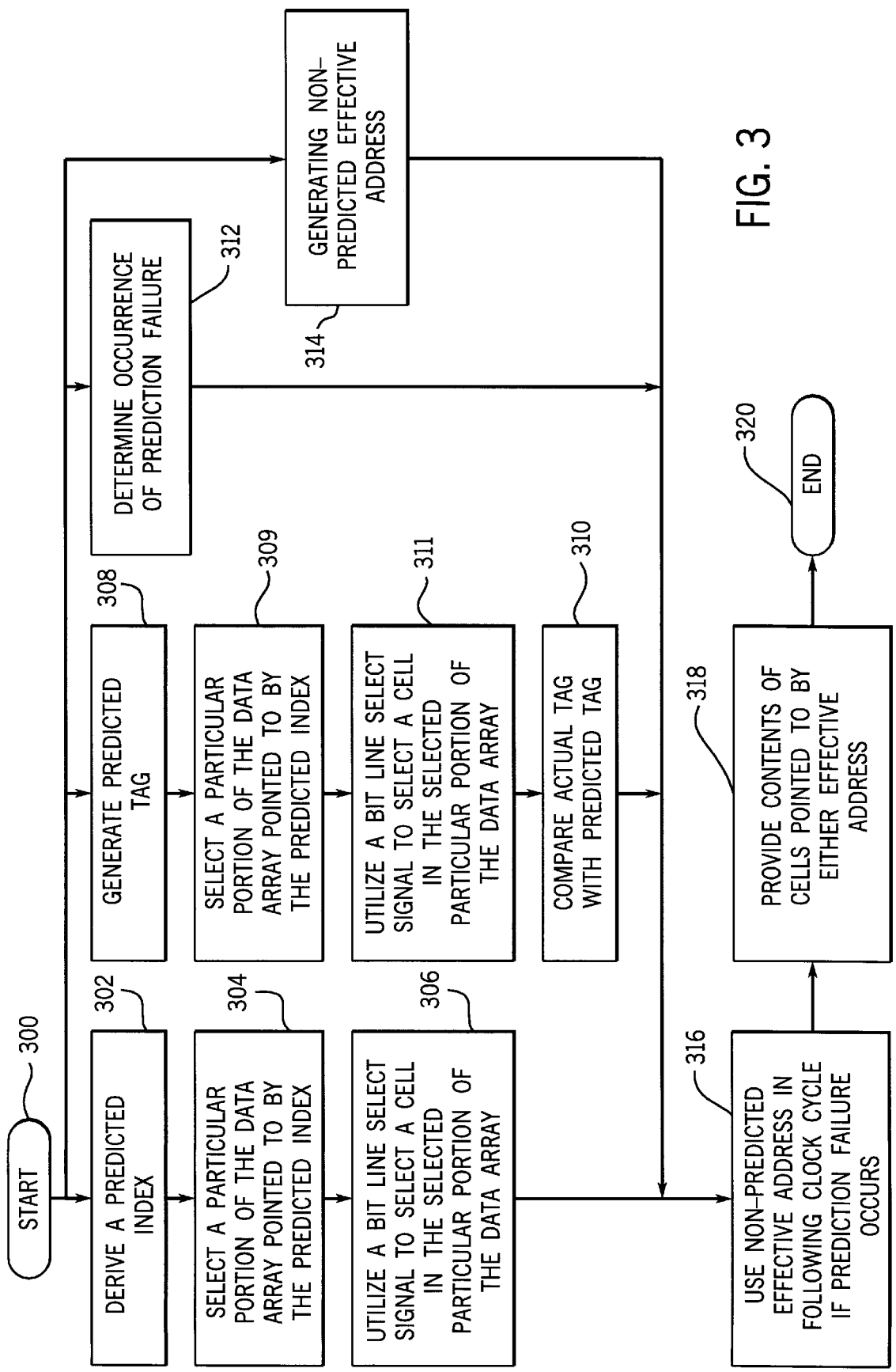
FIG. 3 is a flowchart of a process for predicting an effective address in a data memory array.

The present invention can also be described as a method for predicting an effective address in a data memory array which is shown in a flowchart in FIG. 3 with processing steps 300–320. A predicted index is derived 302 as a carry-free addition of a predetermined number of base register address bits with the same predetermined number of offset register address bits which uniquely address a particular portion of the data memory array. The particular portion of the data memory array is selected 304 by utilizing the predicted index. Subsequently, the contents of one or more memory cells in the selected particular portion of the data memory array are provided 318 to an output port operatively coupled to the data memory array.

The address predictor may be used in conjunction with a translation look-aside buffer. In this instance, the deriving step 302 is optimized for use with the translation look-aside buffer in which the particular portion of the buffer uniquely addressed by the predicted index is a relatively large block size of memory cells.

Alternatively, the data memory array may be used in a data cache. In this instance, the deriving step 302 is optimized for use with the data cache in which the particular portion of the data memory array uniquely addressed by the predicted index is a fixed number of memory cells.

The deriving step 302 preferably uses the predetermined number of base register address bits as a set of predicted index bits when each of the offset register address bits from the predetermined number of offset register address bits equals a null bit.

The predetermined number of base register address bits and the predetermined number of offset register address bits can be divided into three orders of bits such that both have low order bits, middle order bits, and high order bits. The low order bits include actual block offset bits for the data memory array, the middle order bits include set bits for the data memory array, and the high order bits include tag bits for the data memory array. The deriving step 302 can then be described as generating a set of predicted index bits where each predicted index bit is a function of a base register address bit from the predetermined number of base register address bits and one corresponding offset register address bit from the predetermined number of offset register address bits. The function can be one of many types. For example, the function may be a logical OR, a logical exclusive-OR, or an arithmetic ADD.

The deriving step 302 may consist of generating a set of predicted index bits where each predicted index bit is the result of a logical OR or XOR of a base register address bit from the predetermined number of base register address bits and one corresponding offset register address bit from the predetermined number of offset register address bits.

The predetermined number of base register address bits and the predetermined number of offset register bits used in this prediction process is a function of size of the data memory array and a maximum memory cell width of a plurality of rows in the data memory array. In the preferred embodiment process the predetermined number of base register address bits and the predetermined number of offset register bits is at least equal to $\log_2$ of the size of the data memory array minus $\log_2$ of the maximum memory cell width of the plurality of rows in the data memory array minus one.

The prediction process also includes utilizing 306 a bit line select signal to select the at least one memory cell from the particular portion of the data memory array selected by the predicted index. The bit line select signal is generated by adding a particular number of base register address bits with the same particular number of offset register address bits. The particular number of bits is at least $\log_2$ of the maximum memory cell width of the plurality of rows in the data memory array.

The prediction process can be augmented when the data memory array includes a tag array having a row corresponding to each row of the memory cells in the data memory array. The predicted tag may be generated 308 in parallel with the predicted index 302 by adding a particular number of base register address bits with the same particular number of offset register address bits, where the particular number of bits is at least equal to a total number of base register address bits minus $\log_2$ of the size of the data memory array. In a manner similar to the predicted index, the particular portion of the tag array is selected by the predicted index 309 and the bit line select signal 311. The row of the tag array selected by the predicted index is compared 310 with a predicted tag.

The prediction process also determines 312 the occurrence of a failure in predicting an effective address in the data memory array in parallel with the derivation of the predicted index 302 such that the mechanism for performing this determination is decoupled from a data memory array critical access path. Prediction failure can occur in many different conditions. Some of these conditions include:

- a carry-out occurring from generation of the block offset signal by an addition of a particular number of base register address bits with the same particular number of offset register address bits,
- a carry occurring from generation of the predicted row index by an addition of a particular number of base register address bits with the same particular number of offset register address bits,
- a selection of a large negative constant signal which is generated by a set of constant offset bits having a negative value which is large enough to result in an effective address being in a block of the data memory array different from a block of the data memory array addressed by the base register address bits, the set of constant offset bits representing an absolute offset used with each access of a block within the data memory array, and
- a selection of an index register signal which is generated by a particular bit from a set of index register bits having a negative value, the particular bit forming part of a predetermined offset used with each access of a block within the data memory array for corresponding base register address bits.

The prediction process preferably includes the known technique of generating 314 a non-predicted effective address in parallel with the derivation of the predicted index 302 when an occurrence of a failure in predicting an effective address in the data memory array has been determined.

The use of the predicted index for accessing memory cells in the data memory array is done in one clock cycle but, if a prediction failure occurs, the non-predicted effective address is used to access the information and provide 318 it in the following clock cycle to the port based upon one or more prediction rules. These prediction rules limit the use of the predicted index to situations in which the predicted index is likely to be the same as the non-predicted effective address. For example, these prediction rules may include: only predicting a predicted index when the offset register address bits equal null bits, only predicting a predicted index when the offset register address bits represent a small value, only predicting a predicted index for particular classes of microprocessor instructions, only predicting a predicted index for microprocessor instructions marked by a compiler, and always predicting a predicted index.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of shape, size and arrangement of parts within the principles of the present invention to the full extent indicated by the broad general meaning of the terms in which the appended claims are expressed.

What is claimed is:

1. A data cache, comprising:
   (a) a data memory array having a plurality of rows of memory cells;
   (b) row address predictor means, operatively coupled to the data memory array, for selecting one of the plurality of rows of memory cells by deriving a predicted row index as a carry-free addition of a predetermined number of base register address bits with the same predetermined number of offset register address bits which uniquely address one of the plurality of rows of memory cells;
   (c) a verification means for determining occurrence of a failure in predicting an effective address in the data memory array such that the verification means is decoupled from a data memory array critical access path;
   (d) non-predicted effective address means for generating a non-predicted effective address when the verification means determines that a failure has occurred in predicting an effective address in the data memory array,
   wherein the verification means comprises means for controlling the use of the row address predictor means and the non-predicted effective address means for accessing memory cells in the data memory array based upon at least one prediction rule selected from the group consisting of only predicting a row address when the offset register address bits equal null bits, only predicting a row address when the offset register address bits represent a small value, only predicting a row address for particular classes of microprocessor instructions, only predicting a row address for microprocessor instructions marked by a compiler, and always predicting a row address.

2. The data cache of claim 1 wherein the verification means comprises means for determining occurrence of a failure in predicting an effective address in the data memory array based on a selection of an index register signal which is generated by a particular bit from a set of index register bits having a negative value, the particular bit forming part of a predetermined offset used with each access of a block within the data memory array for corresponding base register address bits.

3. A data cache, comprising:
   (a) a data memory array having a plurality of rows of memory cells;
   (b) row address predictor means, operatively coupled to the data memory array, for selecting one of the plurality of rows of memory cells by deriving a predicted row index as a carry-free addition of a predetermined number of base register address bits with the same predetermined number of offset register address bits which uniquely address one of the plurality of rows of memory cells;
   (c) a verification means for determining occurrence of a failure in predicting an effective address in the data memory array such that the verification means is decoupled from a data memory array critical access path;
   wherein the verification means comprises means for determining occurrence of a failure in predicting an effective address in the data memory array based on a selection of a large negative constant signal which is generated by a set of constant offset bits having a negative value which is large enough to result in an effective address being in a block of the data memory array different from a block of the data memory array addressed by the base register address bits, the set of constant offset bits representing an absolute offset used with each access of a block within the data memory array.

4. A method for predicting an effective address in a data memory array, comprising the steps of:
   (a) deriving a predicted index as a carry free addition of a predetermined number of base register address bits with the same predetermined number of offset register address bits which uniquely address a particular portion of the data memory array;
   (b) selecting the particular portion of the data memory array by utilizing the predicted index; and
   (c) providing contents of at least one memory cell in the selected particular portion of the data memory array to an output port operatively coupled to the data memory array,
   (d) determining occurrence of a failure in predicting an effective address in the data memory array such that the mechanism for performing this step is decoupled from a data memory array critical access path;
   (e) generating a non-predicted effective address when the occurrence of a failure in predicting an effective address in the data memory array has been determined; and
   (f) using the predicted index in one clock cycle and subsequently using the non-predicted effective address in a subsequent clock cycle for accessing memory cells in the data memory array based upon at least one prediction rule selected from the group consisting of only predicting a predicted index when the offset register address bits equal null bits, only predicting a predicted index when the offset register address bits represent a small value, only predicting a predicted index for particular classes of microprocessor instructions, only predicting a predicted for microprocessor instructions marked by a compiler, and always predicting a predicted index.

* * * * *

UNITED STATES PATENT AND TRADEMARK OFFICE
CERTIFICATE OF CORRECTION

PATENT NO. : 5,860,151
DATED : January 12, 1999
INVENTOR(S) : Austin et al.

It is certified that error appears in the above-identified patent and that said Letters Patent is hereby corrected as shown below:

Column 1, line 3, insert the following:

> This invention was made with United States government support awarded by the following agencies: NAVY Grant No. NOOO 14-93-1-0465; NSF Grant No. CCR-9303030. The United States has certain rights in this invention.

Signed and Sealed this

Sixth Day of July, 1999

Attest:

Q. TODD DICKINSON

Attesting Officer

Acting Commissioner of Patents and Trademarks